United States Patent
Ahuja et al.

(10) Patent No.: US 12,243,008 B2
(45) Date of Patent: Mar. 4, 2025

(54) SUGGESTING A RECIPE TO A CUSTOMER OF AN ONLINE CONCIERGE SYSTEM BASED ON ITEMS LIKELY TO BE AVAILABLE

(71) Applicant: Maplebear Inc., San Francisco, CA (US)

(72) Inventors: Karuna Ahuja, San Francisco, CA (US); Girija Narlikar, Palo Alto, CA (US); Sneha Chandrababu, Sammamish, WA (US); Gowri Rajeev, San Francisco, CA (US); Lan Wang, Mountain View, CA (US); Chakshu Ahuja, San Jose, CA (US); Sonal Jain, Sunnyvale, CA (US)

(73) Assignee: Maplebear Inc., San Francisco, CA (US)

( * ) Notice: Subject to any disclaimer, the term of this patent is extended or adjusted under 35 U.S.C. 154(b) by 192 days.

(21) Appl. No.: 17/977,734

(22) Filed: Oct. 31, 2022

(65) Prior Publication Data

US 2024/0144173 A1    May 2, 2024

(51) Int. Cl.
    *G06Q 10/00*    (2023.01)
    *G06K 7/10*     (2006.01)
    (Continued)

(52) U.S. Cl.
    CPC ....... *G06Q 10/087* (2013.01); *G06K 7/10366* (2013.01); *G06K 7/1417* (2013.01); *G06Q 30/0202* (2013.01); *G06Q 30/0623* (2013.01)

(58) Field of Classification Search
    None
    See application file for complete search history.

(56) References Cited

U.S. PATENT DOCUMENTS

| | | | |
|---|---|---|---|
| 2015/0324882 A1* | 11/2015 | Ouimet | G06Q 30/0639 705/26.41 |
| 2016/0140646 A1* | 5/2016 | Humphreys | G06Q 10/087 705/26.8 |

(Continued)

OTHER PUBLICATIONS

Praveen, Discovery of Recipes Based on Ingredients using Machine Learning, Feb. 2019, International Research Journal of Engineering and Technology (IRJET), vol. 06 Issue: 02, https://www.irjet.net/archives/V6/i3/IRJET-V61328.pdf, p. 1-4. (Year: 2019).*

*Primary Examiner* — Joseph M Waesco
(74) *Attorney, Agent, or Firm* — Fenwick & West LLP

(57) ABSTRACT

An online concierge system detects acquired items included among an inventory of a customer and identifies one or more candidate available items from the acquired items based on a predicted perishability of each item and a predicted amount of each item that was used. The system retrieves recipes, matches the item(s) likely to be available to a set of recipes based on their ingredients, and identifies any remaining items for each matched recipe not likely to be available. The system retrieves a set of attributes associated with the customer and the set of recipes and computes a suggestion score for each recipe based on the attributes. The system ranks the recipes based on their scores, identifies one or more recipes for suggesting to the customer based on the ranking, and sends the recipe(s) and any remaining items for each recipe to a client device associated with the customer.

18 Claims, 5 Drawing Sheets

(51) Int. Cl.
  *G06K 7/14*    (2006.01)
  *G06Q 10/087*  (2023.01)
  *G06Q 30/0202* (2023.01)
  *G06Q 30/0601* (2023.01)

(56) References Cited

U.S. PATENT DOCUMENTS

| | | | |
|---|---|---|---|
| 2017/0316488 A1* | 11/2017 | Kremen | G09B 5/06 |
| 2018/0033074 A1* | 2/2018 | Grueneberg | G06Q 30/0633 |
| 2018/0232689 A1* | 8/2018 | Minvielle | G06T 7/194 |
| 2019/0228855 A1* | 7/2019 | Leifer | G06F 16/90324 |
| 2019/0304000 A1* | 10/2019 | Simpson | G16B 40/00 |
| 2020/0159736 A1* | 5/2020 | Byron | H04W 4/70 |
| 2020/0265497 A1* | 8/2020 | Leifer | G06N 5/04 |
| 2022/0179870 A1* | 6/2022 | Byron | G06Q 30/0631 |
| 2023/0237554 A1* | 7/2023 | McKean | G06Q 30/0631 705/26.7 |
| 2023/0260007 A1* | 8/2023 | Faurot, III | G06Q 30/0631 705/26.7 |

\* cited by examiner

SUGGESTING A RECIPE TO A CUSTOMER OF AN ONLINE CONCIERGE SYSTEM BASED ON ITEMS LIKELY TO BE AVAILABLE

BACKGROUND

Online concierge systems allow customers to place online delivery orders and match the orders with pickers who service the orders at retailer locations on behalf of the customers. Pickers may service orders by performing different tasks involved in servicing the orders, such as driving to retailer locations, collecting items included in the orders, purchasing the items, and delivering the items to customers. Orders placed by customers with online concierge systems may include a variety of items, such as grocery items. Customers who purchase grocery items often do so with the intent to use them to make certain recipes. For example, to make a certain pasta recipe that includes eight ingredients, a customer may purchase eight grocery items (e.g., pasta, tomatoes, cheese, garlic, parsley, etc.) that correspond to the ingredients in quantities that equal or exceed those required by the recipe.

However, customers who purchase grocery items that are perishable may waste some of these items, which may impact the environment in negative ways (e.g., by increasing greenhouse gas emissions, increasing pressure on water and land resources, etc.). In the above example, the items may spoil or surpass their expiration date if the customer forgets to make the recipe, if they no longer have time to make it, etc. Alternatively, even if the customer makes the recipe, portions of some of the items (e.g., garlic and parsley) may remain unused because the recipe calls for smaller quantities of the items than the quantities that were purchased. In this example, these unused portions may go to waste if the customer forgets that they have them, if they spoil or surpass their expiration dates before the customer makes the recipe again or finds another recipe that uses them, etc. Accordingly, it may be advantageous identify alternative uses for these items.

SUMMARY

In accordance with one or more aspects of the disclosure, to reduce the waste of grocery items while helping customers discover new recipes, an online concierge system suggests a recipe to a customer of the online concierge system based on items likely to be available, or candidate available items. More specifically, the online concierge system detects a set of acquired items associated with the customer, in which the set of acquired items is included among an inventory of the customer. One or more candidate available items are identified from the set of acquired items based on a predicted perishability of each item and a predicted amount of each item that has been used. Multiple recipes that each include one or more ingredients are retrieved and the one or more candidate available items are matched to a set of recipes based on the one or more ingredients of each recipe and the one or more candidate available items. A set of remaining items is identified for each matched recipe, in which a remaining item corresponds to an ingredient of a corresponding recipe that is not included among the one or more candidate available items. A set of attributes associated with the customer and the set of recipes is retrieved and a suggestion score for each recipe is computed based on the set of attributes. Recipes included among the set of recipes are ranked based on their suggestion scores and one or more recipes for suggesting to the customer are identified based on the ranking. The one or more recipes and the set of remaining items for each recipe are then sent to a customer client device associated with the customer.

DETAILED DESCRIPTION

Figure 1:
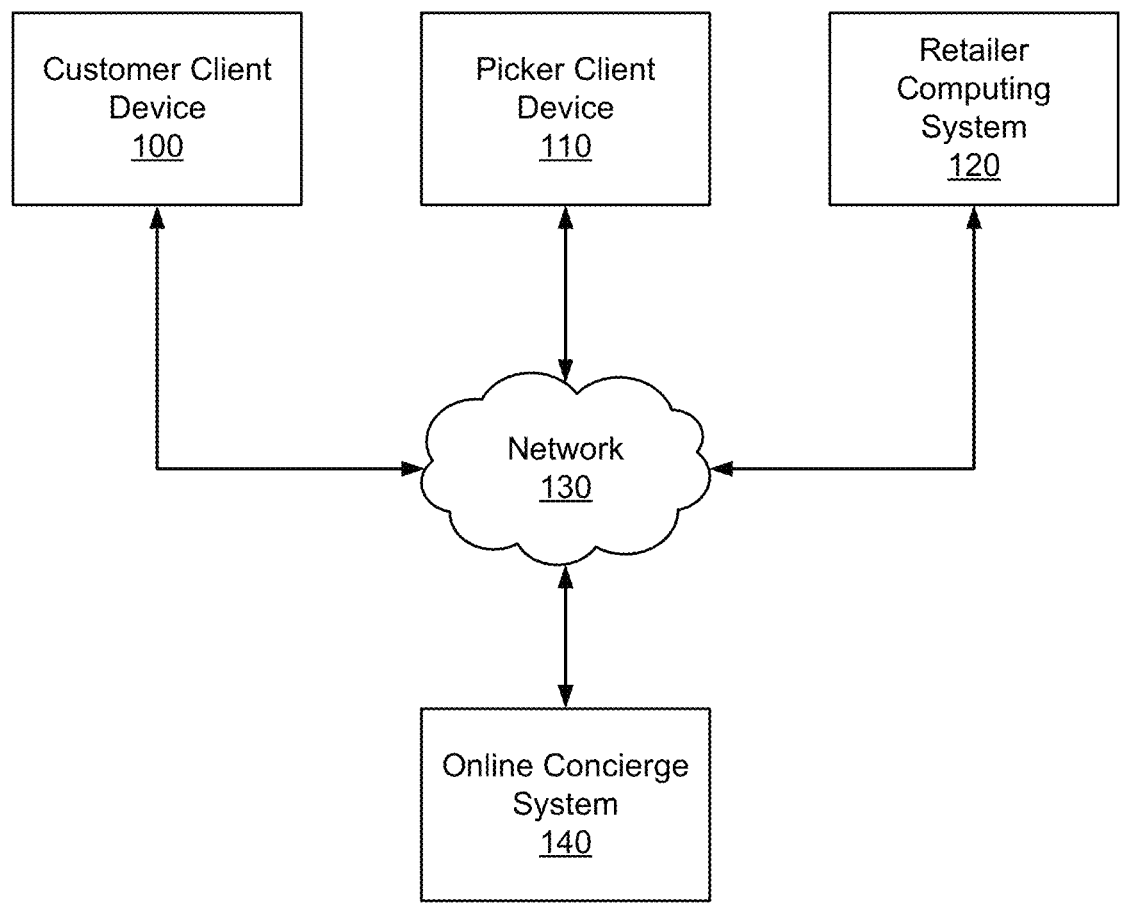
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or a desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the items should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

In some embodiments, the customer client device 100 may monitor the contents of a food storage area associated with the customer. For example, the customer client device 100 may be a smart refrigerator or a smart pantry system that identifies the items within it. The customer client device 100 may identify items in the food storage area in various ways. In some embodiments, the customer client device 100 may include various components (e.g., cameras, barcode readers, RFID scanners, sensors, etc.) that the customer client device 100 uses to capture various types of data associated with items in the food storage area (e.g., image or video data of the items, data identifying the items encoded in barcodes or RFID tags included on packaging for the items, etc.). In such embodiments, the customer client device 100 may then identify the items based on the data captured by one or more of the components directly or by transmitting the data to the online concierge system 140. Furthermore, in some embodiments, the customer client device 100 also may keep track of usage of each item or a date associated with each item indicating its perishability (e.g., an expiration date, a use-by date, a best-by date, a sell-by date, etc.) using one or more of the components described above.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 may provide item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
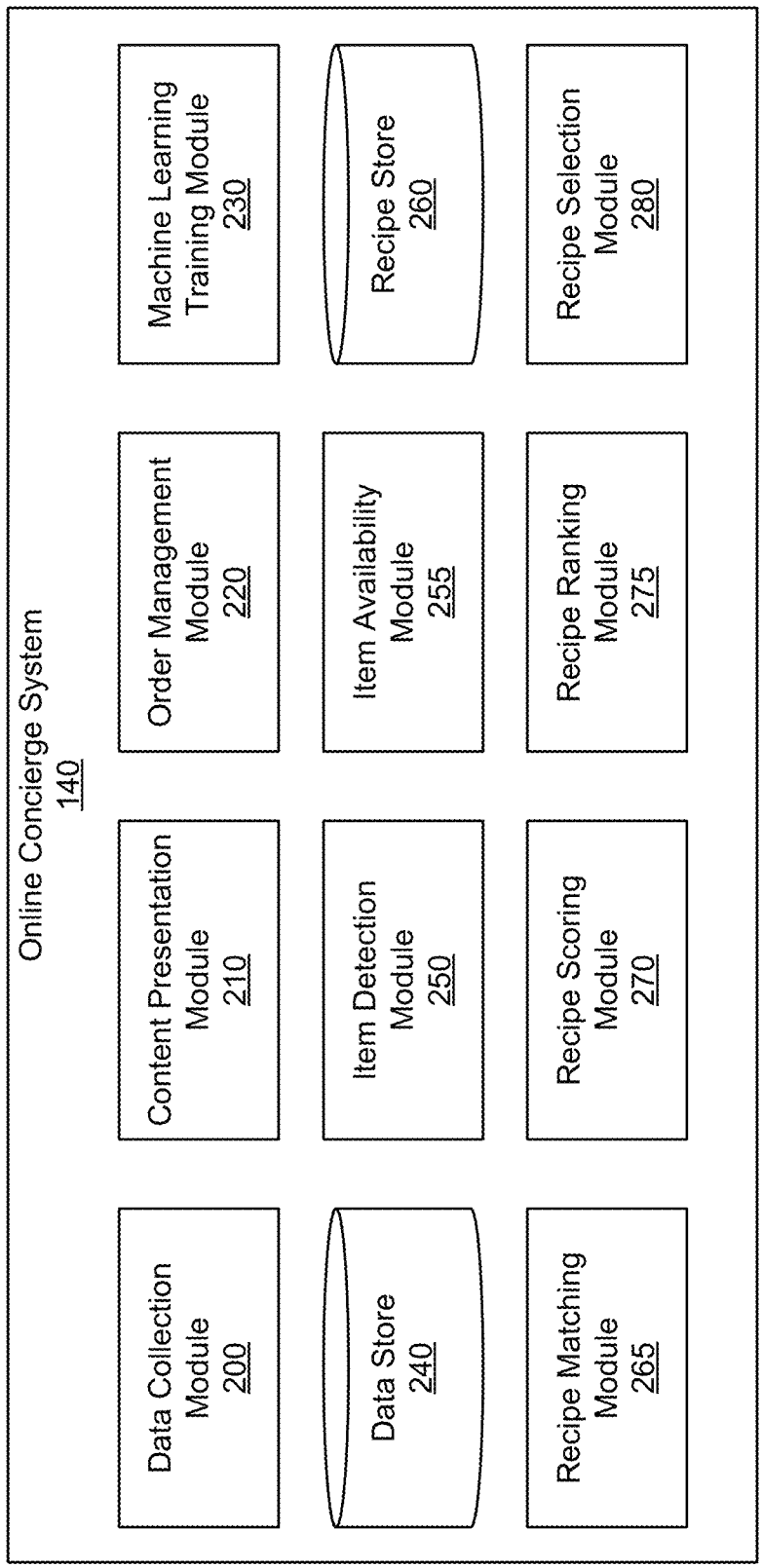
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, a data store 240, an item detection module 250, an item availability module 255, a recipe store 260, a recipe matching module 265, a recipe scoring module 270, a recipe ranking module 275, and a recipe selection module 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The customer data further may include various preferences associated with a customer. In some embodiments, preferences associated with a customer may include the customer's dietary preferences, dietary restrictions, allergies, or dislikes. For example, customer data may indicate that a customer prefers recipes or ingredients for recipes of a certain type of cuisine. As an additional example, customer data may indicate that a customer prefers spicy foods, does not like cream cheese or sour cream, and is allergic to nuts. In some embodiments, preferences associated with a customer also may include the customer's recipe preferences (e.g., an amount of time to prepare recipes, a complexity of the recipes, nutritional information about the recipes, etc.). For example, customer data may indicate that a customer prefers recipes that take less than an hour to make, have complexity levels ranging from "easy" to "intermediate," and are low in calories and saturated fat. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. The item data also may include barcodes, QR codes, etc. that may be used to identify each item. Additionally, item data may also include attributes of items such as the size, color, weight, stock keeping unit (SKU), or serial number for the items. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The content presentation module 210 also may send one or more recipes selected by the recipe selection module 280 and a set of remaining items identified for each recipe to a customer client device 100 associated with a customer, as further described below. In such embodiments, each recipe may be presented in association with the set of remaining items identified for the recipe. Furthermore, in embodiments in which multiple recipes are selected by the recipe selection module 280, the recipes may be presented in an order based on their ranking by the recipe ranking module 275, as further described below.

In embodiments in which the item detection module 250 detects any acquired items associated with a customer that were not included in an order placed by the customer with the online concierge system 140 and accesses a set of content items associated with these items, as described below, the content presentation module 210 may send the set of content items to the customer client device 100 associated with the customer. For example, the item detection module 250 may send a promotion, a coupon, an advertisement, a social media post, etc. associated with an acquired item that was not included in an order placed by the customer to the customer client device 100. The content presentation module 210 may send the set of content items to the customer client device 100 while the customer is placing an order (e.g., in the ordering interface), in association with a catalog of items, with one or more recipes selected by the recipe selection module 280 and a set of remaining items identified for each recipe, or in association with any other suitable content.

The order management module 220 manages orders for items from customers. The order management module 220 receives orders from a customer client device 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer who placed the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

In embodiments in which the item availability module 255 accesses an acquired item availability model that is trained to predict an availability of an acquired item detected by the item detection module 250 to a customer, as described below, the machine learning training module 230 may train the acquired item availability model. An acquired item is available to a customer if an amount of the item is unspoiled, has not exceeded its expiration date, etc. The machine learning training module 230 may train the acquired item availability model via supervised learning based on various attributes associated with items and a label for each item indicating its availability. Attributes of an item used to train the acquired item availability model may include item data for the item such as its type, color, size, or volume (e.g., relative to other items of a known or standard color, size, or volume), an amount of time elapsed since it was acquired or detected by the item detection module 250, an average daily usage of the item, a date indicating its perishability (e.g., an expiration date, a use-by date, a best-by date, a sell-by date, etc.), or any other suitable attributes. For example, the machine learning training module 230 may receive a set of training examples including attributes of items included among inventories of one or more retailer locations. In this example, the machine learning training module 230 also may receive a human-generated label for each item indicating an availability of the item. Continuing with this example, the machine learning training module 230 may then train the acquired item availability model based on the attributes of the items and the label for each item by comparing its output from input data of each training example to the label for the training example. In embodiments in which the acquired item availability model predicts an availability of a quantity of an acquired item to a customer, the label for each item may indicate an availability of a quantity of the item.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, the hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The data store 240 also may store images or videos of items that are available to customers. In some embodiments, the images or videos may be included in a catalog of items received from one or more retailers or retailer locations. In such embodiments, the catalog of items also may include an item category associated with each item, an item identifier associated with each item, attributes associated with each item, or any other suitable types of item data associated with an item.

In some embodiments, the data store 240 also stores various types of content items associated with items. Examples of content items include promotions, coupons, advertisements, social media posts, or any other suitable types of content items that feature one or more items included among the inventories of one or more retailer locations. Each content item may be stored in association with various types of information, such as information identifying one or more items associated with the content item, information describing a type of the content item (e.g., coupon, social media post, advertisement, etc.), information identifying one or more retailer locations associated with the content item (e.g., if a coupon is valid only at specific retailer locations), etc.

The item detection module 250 may detect a set of acquired items associated with a customer of the online concierge system 140, in which the set of acquired items is included among an inventory of the customer. In some embodiments, the inventory of the customer includes the contents of one or more orders previously placed by the customer. For example, the inventory of the customer may include one or more items in an order previously placed by the customer. In various embodiments, the inventory of the customer includes the contents of one or more orders placed by the customer within a threshold amount of time of a current time (e.g., within the past three months). The inventory of the customer also may include the contents of a shopping cart system or a checkout system associated with the customer. For example, a smart shopping cart system or a smart checkout system that includes various sensors, readers/scanners, cameras, etc. may identify items placed into the smart shopping cart or the smart checkout system (e.g., by applying computer-vision techniques to images or videos of the items) that are subsequently purchased by the customer or by a picker servicing an order on behalf of the customer. In this example, information identifying the items may be communicated to the item detection module 250 by the smart shopping cart system or the smart checkout system (e.g., either directly or via a retailer computing system 120).

In some embodiments, the inventory of the customer also may include a tentative set of items that the user has selected for an order but that has not yet been finalized for the order. The tentative set of items may include the contents of a virtual or a physical shopping cart or shopping list associated with the customer or a list of items on an automatic ordering schedule set by the customer. For example, the set of acquired items associated with the customer detected by the item detection module 250 may include items added to a shopping cart or a shopping list associated with the customer or items that the customer has set to be delivered to them once a week. The item detection module 250 may include the tentative set of items among the set of acquired items associated with the customer unless they are removed from a shopping cart (e.g., a virtual shopping cart or a smart shopping cart system and not subsequently purchased), unless their delivery is canceled by the customer, etc.

In various embodiments, the inventory of the customer also may include the contents of a food storage area (e.g., a refrigerator, a pantry, a cupboard, a shelf, a counter, etc.) associated with the customer. In such embodiments, the item detection module 250 may detect the set of acquired items based on data associated with the contents of the food storage area captured by a customer client device 100 associated with the customer. For example, if the customer client device 100 is a personal or mobile computing device with a camera, such as a smartphone or a tablet, the item detection module 250 may detect the set of acquired items based on image or video data captured by the camera of the customer client device 100, in which the image or video data depict the contents of the food storage area. As an additional example, if the customer client device 100 is a smart refrigerator or a smart pantry system that identifies the items within it, the item detection module 250 may detect the set of acquired items associated with the customer based on information received from the customer client device 100 describing its contents.

In some embodiments, once the item detection module 250 receives data associated with the contents of the food storage area captured by the customer client device 100, the item detection module 250 may detect the set of acquired items by accessing the data store 240 and comparing the data received from the customer client device 100 to item data stored in the data store 240. For example, the item detection module 250 may detect an acquired item in the food storage area if an item depicted in an image or a video capturing the contents of the food storage area received from the customer client device 100 has at least a threshold measure of similarity to one or more images of the item stored in the data store 240. In the above example, the item detection module 250 also may detect the acquired item if packaging for the item includes a barcode or a QR code that identifies the item (e.g., if the barcode or QR code matches item data for the item stored in the data store 240). Alternatively, in the above example, the item detection module 250 also may detect the acquired item if the packaging for the item includes an RFID tag that transmits data (e.g., a SKU) to the customer client device 100, which the item detection module 250 may use to identify the item. In some embodiments, the item detection module 250 also may detect an amount (e.g., a number, a size, a volume, etc.) of each acquired item. For example, each time the item detection module 250 detects an item within the food storage area, it may increment a count associated with the item by one.

In various embodiments, the item detection module 250 may use an item detection model to detect acquired items in the food storage area. An item detection model is a machine learning model that is trained to identify items depicted in image or video data captured by a customer client device 100 based on item data for the items. For example, the item detection model may be trained to determine a likelihood that a particular item is in the food storage area based on image or video data capturing the contents of the food storage area. In this example, the item detection module 250 may detect that the item is in the food storage area if the likelihood is at least a threshold likelihood.

In some embodiments, once the item detection module 250 has detected the set of acquired items associated with the customer, the item detection module 250 also may identify one or more of the acquired items that were not included in an order placed by the customer with the online concierge system 140. The item detection module 250 may do so by comparing the set of acquired items to item data for items that are included in each order associated with the customer (e.g., from the order data in the content store 240). The item detection module 250 may then access a set of content items associated with the identified items. Examples of content items include promotions, coupons, advertisements, social media posts, or any other suitable types of content items that feature one or more items included among the inventories of one or more retailer locations. The item detection module 250 may access the content items from the content store 240, the retailer computing system 120, one or more third-party systems (e.g., websites or applications), or any other suitable source.

The item availability module 255 identifies one or more candidate available items to a customer from a set of acquired items associated with the customer detected by the item detection module 250. An acquired item detected by the item detection module 250 is available to the customer if an amount of the item is unspoiled, has not exceeded its expiration date, etc. For example, the item availability module 255 identifies the candidate available items from the acquired items, such that the candidate available items exclude any acquired items that may no longer be used to make a recipe (e.g., because they have been used up, are spoiled, have surpassed their expiration dates, etc.). The item availability module 255 may identify the one or more candidate available items to the customer based on a predicted perishability of each acquired item or a predicted amount of each acquired item that has been used. The item availability module 255 may predict a perishability of an acquired item based on various types of information, such as a time that the item was acquired (e.g., delivered or purchased), a present time, a date associated with the acquired item indicating its perishability (e.g., an expiration date, a use-by date, a best-by date, a sell-by date, etc.), an amount of the acquired item, or any other suitable types of information. For example, if a large quantity of an acquired item was delivered three days ago that has an expiration date five days from a current date, the item availability module 255 may predict that the acquired item is likely to be currently available based on an average daily usage of the type of item. As an additional example, if an acquired item detected within a food storage area includes a sell-by date, the item availability module 255 may predict that the acquired item is likely to be available for up to a threshold number of days after the sell-by date.

In some embodiments, the item availability module 255 may identify the one or more candidate available items to the customer by accessing an acquired item availability model that is trained to predict an availability of an acquired item and applying the acquired item availability model to predict the availability of each acquired item. The acquired item availability model may predict an availability of an acquired item based on various attributes associated with the item, such as its type, color, size, amount (e.g., relative to other items of a known or standard color, size, or amount), or any other types of item data for the item, an amount of time that has elapsed since it was acquired or detected, an average daily usage of the item, a date associated with the item indicating its perishability, etc. For example, suppose that the item detection module 250 has detected a head of cabbage and a head of lettuce in a refrigerator based on an image of the contents of the refrigerator captured by the customer client device 100 associated with the customer. In this example, if the leaves of the head of cabbage do not have any blemishes and are shiny and bright green, while the leaves of the head of lettuce appear wilted, dull, and brown, the acquired item availability model may predict that the entire head of cabbage is available and that none of the head of lettuce is available.

In some embodiments, the item availability module 255 also may identify a quantity of an acquired item likely to be available to the customer. For example, if a certain quantity of an acquired item that was delivered one day ago has an expiration date two weeks from a current date, the item availability module 255 may predict that at least a threshold quantity of the acquired item is likely to be currently available based on an average daily usage of the type of item. In some embodiments, the item availability module 255 may access and apply the acquired item availability model to predict an availability of a quantity of an acquired item. For example, if a container of cream is detected by the item detection module 250, the acquired item availability model may predict an amount of the cream that is available based on a size of the container, an average daily usage of cream, and an amount of time that has elapsed since the cream was acquired. In the above example, if the container is partially transparent, the acquired item availability model also may predict the amount of cream that is available based on a portion of the container filled by the cream depicted in an image captured by the customer client device 100 associated with the customer. As yet another example, if a portion of a head of garlic is detected by the item detection module 250 based on an image of the contents of a food storage area captured by the customer client device 100 associated with the customer, the acquired item availability model may predict an amount of the garlic that is available based on an amount of time that has elapsed since the head of garlic was acquired and the size of the portion of the head of garlic relative to another item detected by the item detection module 250 of a known or standard size (e.g., a box of cereal). The acquired item availability model may be trained by the machine learning training module 230, as described above.

The recipe store 260 includes information identifying recipes obtained by the online concierge system 140. A recipe includes one or more ingredients that each correspond to an item. A recipe also may include a quantity of each item and information describing how to combine the items in the recipe. Recipes may be obtained from users, third-party systems (e.g., websites or applications), or any other suitable source, and stored in the recipe store 260. Additionally, each recipe may have one or more attributes describing the recipe. Examples of attributes of a recipe include ingredients of the recipe, an amount of time to prepare the recipe, a complexity of the recipe, nutritional information about the recipe, a genre of the recipe, or any other suitable information. Attributes of a recipe may be included in the recipe by a source from which the recipe was received or may be determined by the online concierge system 140 from items in the recipe or other information included in the recipe.

Additionally, in some embodiments, the recipe store 260 maintains a recipe graph identifying connections between recipes in the recipe store 260. A connection between a recipe and another recipe indicates that the connected recipes each have one or more common attributes. In some embodiments, a connection between a recipe and another recipe indicates that a customer included items from each connected recipe in a common order or included items from each connected recipe in orders the online concierge system 140 received from the customer within a threshold amount of time of each other. In various embodiments, each connection between recipes includes a value, with the value providing an indication of a strength of a connection between the recipes.

The recipe matching module 265 retrieves recipes (e.g., from the recipe store 260) and matches one or more candidate available items to a customer with a set of the recipes. The recipe matching module 265 may do so based on one or more ingredients of each recipe and the one or more candidate available items to the customer. For example, the recipe matching module 265 may match the one or more candidate available items to the customer with a recipe if at least a threshold number or percentage of the ingredients of the recipe correspond to the one or more candidate available items to the customer. In embodiments in which the item availability module 255 identifies a quantity of each acquired item likely to be available to the customer, the recipe matching module 265 may match the one or more candidate available items to the customer with the set of recipes based on the quantity of each ingredient required for each recipe and the quantity of each of the one or more candidate available items to the customer. For example, suppose that only one 14-ounce can of tomatoes is included among the items identified by the item availability module 255 likely to be available to the customer and a recipe calls for 28 ounces of canned tomatoes. In this example, if none of the other ingredients of the recipe are included among the candidate available items to the customer, the recipe matching module 265 may not match the candidate available items to the customer with this recipe.

The recipe matching module 265 also identifies a set of remaining items for each recipe it matches with the one or more candidate available items to the customer, in which each remaining item corresponds to an ingredient of a recipe that is not included among the one or more candidate available items to the customer. For example, suppose that the recipe matching module 265 matches the one or more candidate available items to the customer with a recipe if at least half of the ingredients of the recipe are included among the one or more candidate available items to the customer. In this example, if three out of five ingredients of a recipe correspond to the one or more candidate available items to the customer, the recipe matching module 265 matches the one or more candidate available items to the customer with this recipe and identifies the two remaining items for the recipe.

The recipe scoring module 270 retrieves a set of attributes associated with a customer and a set of recipes that the recipe matching module 265 matches with one or more candidate available items to the customer. The set of attributes retrieved by the recipe scoring module 270 may include one or more preferences associated with the customer stored in the data store 240. As described above, preferences associated with a customer may include the customer's dietary preferences (e.g., for certain cuisines or ingredients), dietary restrictions (e.g., vegetarian, vegan, etc.), allergies, or dislikes, and the customer's recipe preferences. For example, the recipe scoring module 270 may retrieve a set of preferences associated with a customer indicating that the customer prefers spicy foods with rice or noodles as ingredients, is allergic to nuts and dairy, and prefers to make recipes that involve frying and require less than two hours to prepare. The set of attributes retrieved by the recipe scoring module 270 also may include ingredients of each recipe that the recipe matching module 265 matches with the one or more candidate available items to the customer, an amount of time to prepare each recipe, a complexity of each recipe, nutritional information about each recipe, a genre of each recipe, etc. In some embodiments, the set of attributes associated with the customer and the set of recipes also may include a number or a percentage of the one or more candidate available items to the customer that correspond to the ingredients of each of the set of recipes. For example, if the recipe matching module 265 identifies three remaining items out of six items corresponding to ingredients of a recipe it matches with the one or more candidate available items to the customer, the set of attributes associated with the customer and the set of recipes may include an attribute indicating that three or 50% of the candidate available items to the customer correspond to the ingredients of this recipe.

In various embodiments, the set of attributes associated with the customer and the set of recipes retrieved by the recipe scoring module 270 also may include an expected value associated with a set of remaining items for each of the set of recipes. The expected value associated with the set of remaining items for a recipe may be based on a probability that the customer will acquire each remaining item and a value associated with each remaining item. For example, suppose that the recipe matching module 265 identifies two remaining items for a recipe it matches with the candidate available items to the customer. In this example, the expected value associated with each remaining item may be calculated as a product of a price of the item and a probability that the customer will purchase the item. Continuing with this example, the expected value associated with the remaining items may be calculated as a sum of the expected values associated with the items. The probability that the customer will acquire a remaining item may be determined by accessing and applying the item selection model, as described above.

The recipe scoring module 270 also computes a suggestion score for each recipe included among the set of recipes that the recipe matching module 265 matches with the one or more candidate available items to the customer. The recipe scoring module 270 may compute the suggestion score for each recipe based on one or more of the set of attributes associated with the customer and the set of recipes. The suggestion score for a recipe may account for various factors, such as a likelihood that the customer will have an affinity for the recipe, the number or the percentage of the one or more candidate available items to the customer that correspond to the ingredients of the recipe, the expected value associated with the set of remaining items for the recipe, etc. For example, the suggestion score for a recipe may be proportional to the likelihood that the customer will have an affinity for the recipe, the number or the percentage of the candidate available items to the customer that correspond to the ingredients of the recipe, and the expected value associated with the set of remaining items for the recipe.

The recipe ranking module 275 ranks recipes included among a set of recipes that the recipe matching module 265 matches with one or more candidate available items to a customer. The recipe ranking module 275 may rank the set of recipes based on a suggestion score associated with each recipe. For example, the recipe ranking module 275 may rank recipes based on their suggestion scores, such that recipes having higher suggestion scores are ranked higher than recipes having lower suggestion scores.

The recipe selection module 280 may select one or more recipes for suggesting to a customer from a set of recipes that the recipe matching module 265 matches with one or more candidate available items to the customer. In some embodiments, once the recipe ranking module 275 has ranked the set of recipes, the recipe selection module 280 may select one or more recipes for suggesting to the customer based on the ranking. For example, the recipe selection module 280 may select one or more of the set of recipes with ranks that exceed some threshold (e.g., the top n ranked items or the p percentile of items) for suggesting to the customer. In various embodiments, the recipe selection module 280 may select one or more recipes for suggesting to the customer with suggestion scores that exceed some threshold. For example, rather than selecting one or more recipes based on their ranking, the recipe selection module 280 may select one or more recipes with suggestion scores that exceed a threshold suggestion score.

Figure 3:
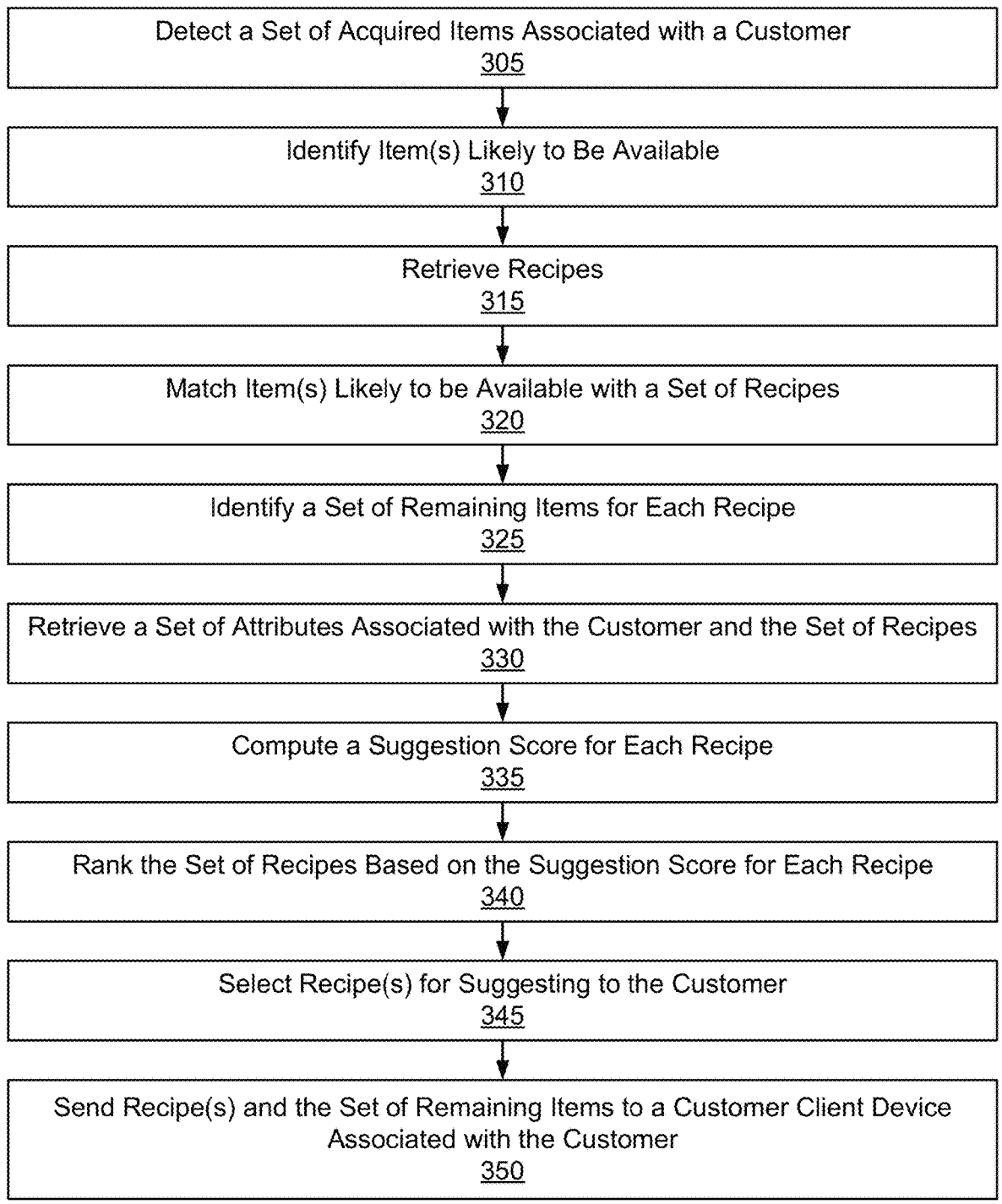
FIG. 3 is a flowchart of a method for suggesting a recipe to a customer of an online concierge system based on candidate available items, in accordance with one or more embodiments.

Suggesting a Recipe to a Customer of an Online Concierge System Based on Candidate Available Items FIG. 3 is a flowchart of a method for suggesting a recipe to a customer of an online concierge system based on candidate available items, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system 140 detects 305 (e.g., using the item detection module 250) a set of acquired items associated with a customer of the online concierge system 140, in which the set of acquired items is included among an inventory of the customer. In some embodiments, the inventory of the customer includes the contents of one or more orders previously placed by the customer. For example, the inventory of the customer may include one or more items in an order previously placed by the customer. In various embodiments, the inventory of the customer includes the contents of one or more orders placed by the customer within a threshold amount of time of a current time (e.g., within the past three months). The inventory of the customer also may include the contents of a shopping cart system or a checkout system associated with the customer. For example, a smart shopping cart system or a smart checkout system that includes various sensors, readers/scanners, cameras, etc. may identify items placed into the smart shopping cart or the smart checkout system (e.g., by applying computer-vision techniques to images or videos of the items) that are subsequently purchased by the customer or by a picker servicing an order on behalf of the customer. In this example, information identifying the items may be communicated to the online concierge system 140 by the smart shopping cart system or the smart checkout system (e.g., either directly or via a retailer computing system 120).

In some embodiments, the inventory of the customer also may include a tentative set of items that the user has selected for an order but that has not yet been finalized for the order. The tentative set of items may include the contents of a virtual or a physical shopping cart or shopping list associated with the customer or a list of items on an automatic ordering schedule set by the customer. For example, the set of acquired items associated with the customer detected 305 by the online concierge system 140 may include items added to a shopping cart or a shopping list associated with the customer or items that the customer has set to be delivered to them once a week. The online concierge system 140 may include the tentative set of items among the set of acquired items associated with the customer unless they are removed from a shopping cart (e.g., a virtual shopping cart or a smart shopping cart system and not subsequently purchased), unless their delivery is canceled by the customer, etc.

Figure 4:
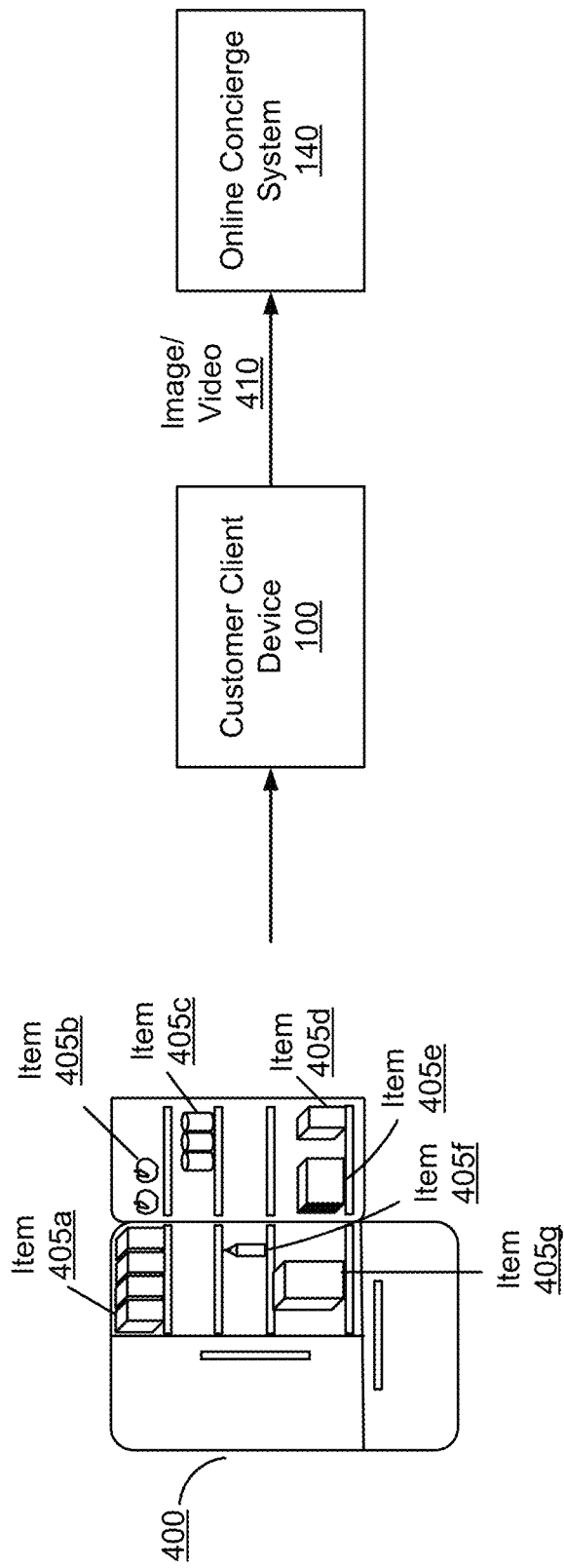
FIG. 4 illustrates a conceptual diagram of a method for receiving data associated with a set of contents of a food storage area, in accordance with one or more embodiments.

In various embodiments, the inventory of the customer also may include the contents of a food storage area (e.g., a refrigerator, a pantry, a cupboard, a shelf, a counter, etc.) associated with the customer. In such embodiments, the online concierge system 140 may detect 305 the set of acquired items based on data associated with the contents of the food storage area captured by a customer client device 100 associated with the customer. An example of a food storage area 400 is shown in FIG. 4, which illustrates a conceptual diagram of a method for receiving data associated with a set of contents of a food storage area 400, in accordance with one or more embodiments. In this example, if the customer client device 100 is a personal or mobile computing device with a camera, such as a smartphone or a tablet, the online concierge system 140 may detect 305 the set of acquired items 405 based on an image or video 410 captured by the camera of the customer client device 100, in which the image or video 410 depicts the contents (e.g., items 405*a-g*) of the food storage area 400 (e.g., a refrigerator). As an additional example, if the customer client device 100 is a smart refrigerator or a smart pantry system that identifies the items 405 within it, the online concierge system 140 may detect 305 the set of acquired items 405 associated with the customer based on information received from the customer client device 100 describing its contents.

In some embodiments, once the online concierge system 140 receives data associated with the contents of the food storage area 400 captured by the customer client device 100, the online concierge system 140 may detect 305 the set of acquired items 405 by accessing item data (e.g., stored in the data store 240) and comparing the data received from the customer client device 100 to the item data. For example, the online concierge system 140 may detect 305 an acquired item 405 in the food storage area 400 if an item 405 depicted in an image or a video 410 capturing the contents of the food storage area 400 received from the customer client device 100 has at least a threshold measure of similarity to one or more images of the item 405 (e.g., stored in the data store 240). In the above example, the online concierge system 140 also may detect 305 the acquired item 405 if packaging for the item 405 includes a barcode or a QR code that identifies the item 405 (e.g., if the barcode or QR code matches item data for the item 405). Alternatively, in the above example, the online concierge system 140 also may detect 305 the acquired item 405 if the packaging for the item 405 includes an RFID tag that transmits data (e.g., a SKU) to the customer client device 100, which the online concierge system 140 may use to identify the item 405. In some embodiments, the online concierge system 140 also may detect 305 an amount (e.g., a number, a size, a volume, etc.) of each acquired item 405. For example, each time the online concierge system 140 detects 305 an item 405 within the food storage area 400, it may increment a count associated with the item 405 by one.

In various embodiments, the online concierge system 140 may use an item detection model to detect (step 305) acquired items 405 in the food storage area 400. An item detection model is a machine learning model that is trained to identify items 405 depicted in image or video data captured by a customer client device 100 based on item data for the items 405. For example, the item detection model may be trained to determine a likelihood that a particular item 405 is in the food storage area 400 based on image or video data capturing the contents of the food storage area 400. In this example, the online concierge system 140 may detect 305 that the item 405 is in the food storage area 400 if the likelihood is at least a threshold likelihood.

In some embodiments, once the online concierge system 140 has detected 305 the set of acquired items 405 associated with the customer, the online concierge system 140 also may identify (e.g., using the item detection module 250) one or more of the acquired items 405 that were not included in an order placed by the customer with the online concierge system 140. The online concierge system 140 may do so by comparing the set of acquired items 405 to item data for items 405 that are included in each order associated with the customer (e.g., from the order data in the content store 240). The online concierge system 140 may then access (e.g., using the item detection module 250) a set of content items associated with the identified items 405. Examples of content items include promotions, coupons, advertisements, social media posts, or any other suitable types of content items that feature one or more items 405 included among the inventories of one or more retailer locations. The online concierge system 140 may access the content items from one or more databases maintained in the online concierge system 140 (e.g., in the content store 240), the retailer computing system 120, one or more third-party systems (e.g., websites or applications), or any other suitable source.

Referring again to FIG. 3, the online concierge system 140 then identifies 310 (e.g., using the item availability module 255) one or more items 405 likely to be available to the customer from the set of acquired items 405 associated with the customer detected 305 by the online concierge system 140. An acquired item 405 detected 305 by the online concierge system 140 is available to the customer if an amount of the item 405 is unspoiled, has not exceeded its expiration date, etc. For example, the online concierge system 140 identifies 310 the items 405 likely to be available from the acquired items 405, such that the items 405 likely to be available exclude any acquired items 405 that may no longer be used to make a recipe (e.g., because they have been used up, are spoiled, have surpassed their expiration dates, etc.). The online concierge system 140 may identify 310 the one or more items 405 likely to be available to the customer based on a predicted perishability of each acquired item 405 or a predicted amount of each acquired item 405 that has been used. The online concierge system 140 may predict a perishability of an acquired item 405 based on various types of information, such as a time that the item 405 was acquired (e.g., delivered or purchased), a present time, a date associated with the acquired item 405 indicating its perishability (e.g., an expiration date, a use-by date, a best-by date, a sell-by date, etc.), an amount of the acquired item 405, or any other suitable types of information. For example, if a large quantity of an acquired item 405 was delivered three days ago that has an expiration date five days from a current date, the online concierge system 140 may predict that the acquired item 405 is likely to be currently available based on an average daily usage of the type of item 405. As an additional example, if an acquired item 405 detected 305 within a food storage area 400 includes a sell-by date, the online concierge system 140 may predict that the acquired item 405 is likely to be available for up to a threshold number of days after the sell-by date.

In some embodiments, the online concierge system 140 may identify 310 the one or more items 405 likely to be available to the customer by accessing an acquired item availability model that is trained to predict an availability of an acquired item 405 and applying the acquired item availability model to predict the availability of each acquired item 405. The acquired item availability model may predict an availability of an acquired item 405 based on various attributes associated with the item 405, such as its type, color, size, amount (e.g., relative to other items 405 of a known or standard color, size, or amount), or any other types of item data for the item 405, an amount of time that has elapsed since it was acquired or detected 305, an average daily usage of the item 405, a date associated with the item 405 indicating its perishability, etc. For example, suppose that the online concierge system 140 has detected 305 a head of cabbage and a head of lettuce in a refrigerator based on an image 410 of the contents of the refrigerator captured by the customer client device 100 associated with the customer. In this example, if the leaves of the head of cabbage do not have any blemishes and are shiny and bright green, while the leaves of the head of lettuce appear wilted, dull, and brown, the acquired item availability model may predict that the entire head of cabbage is available and that none of the head of lettuce is available.

In some embodiments, the online concierge system 140 also may identify 310 a quantity of an acquired item 405 likely to be available to the customer. For example, if a certain quantity of an acquired item 405 that was delivered one day ago has an expiration date two weeks from a current date, the online concierge system 140 may predict that at least a threshold quantity of the acquired item 405 is likely to be currently available based on an average daily usage of the type of item 405. In some embodiments, the online concierge system 140 may access and apply the acquired item availability model to predict an availability of a quantity of an acquired item 405. For example, if a container of cream is detected 305 by the online concierge system 140, the acquired item availability model may predict an amount of the cream that is available based on a size of the container, an average daily usage of cream, and an amount of time that has elapsed since the cream was acquired. In the above example, if the container is partially transparent, the acquired item availability model also may predict the amount of cream that is available based on a portion of the container filled by the cream depicted in an image captured by the customer client device 100 associated with the customer. As yet another example, if a portion of a head of garlic is detected 305 by the online concierge system 140 based on an image 410 of the contents of a food storage area 400 captured by the customer client device 100 associated with the customer, the acquired item availability model may predict an amount of the garlic that is available based on an amount of time that has elapsed since the head of garlic was acquired and the size of the portion of the head of garlic relative to another item 405 detected 305 by the online concierge system 140 of a known or standard size (e.g., a box of cereal). The acquired item availability model may be trained by the online concierge system 140 (e.g., using the machine learning training module 230).

The online concierge system 140 retrieves (step 315, e.g., using the recipe matching module 265) recipes obtained by the online concierge system 140 (e.g., from the recipe store 260). A recipe includes one or more ingredients that each correspond to an item 405. A recipe also may include a quantity of each item 405 and information describing how to combine the items 405 in the recipe. Recipes may be obtained from users, third-party systems (e.g., websites or applications), or any other suitable source, and stored in the online concierge system 140 (e.g., in the recipe store 260). Additionally, each recipe may have one or more attributes describing the recipe. Examples of attributes of a recipe include ingredients of the recipe, an amount of time to prepare the recipe, a complexity of the recipe, nutritional information about the recipe, a genre of the recipe, or any other suitable information. Attributes of a recipe may be included in the recipe by a source from which the recipe was received or may be determined by the online concierge system 140 from items 405 in the recipe or other information included in the recipe.

Figure 5:
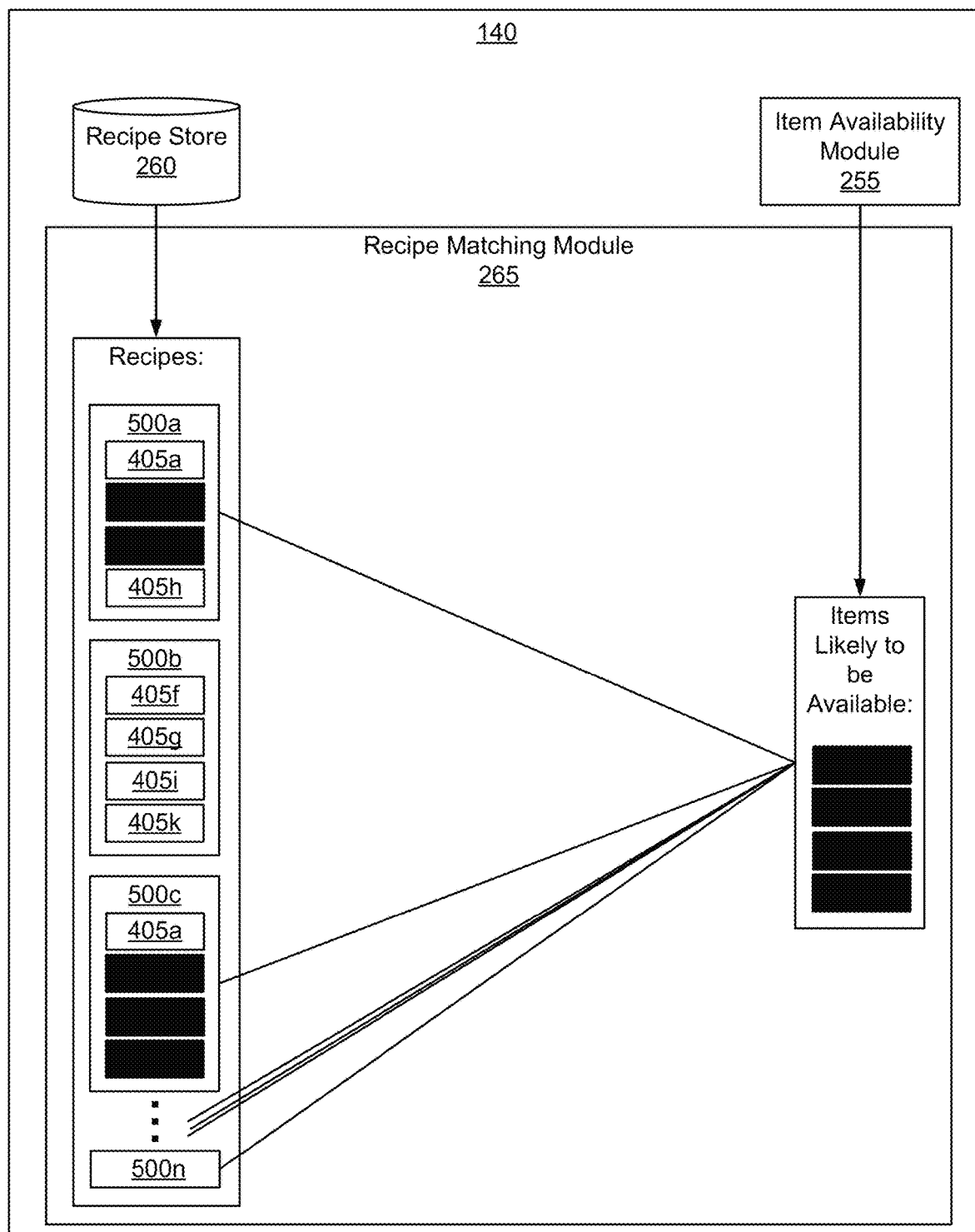
FIG. 5 illustrates a conceptual diagram of a method for matching candidate available items to a customer of an online concierge system with a set of recipes, in accordance with one or more embodiments.

The online concierge system 140 matches 320 (e.g., using the recipe matching module 265) the one or more items 405 likely to be available to the customer with a set of the recipes. The online concierge system 140 may do so based on one or more ingredients of each recipe and the one or more items 405 likely to be available to the customer. For example, the online concierge system 140 may match 320 the one or more items 405 likely to be available to the customer with a recipe if at least a threshold number or percentage of the ingredients of the recipe correspond to the one or more items 405 likely to be available to the customer. An additional example is shown in FIG. 5, which illustrates a conceptual diagram of a method for matching items 405 likely to be available to a customer of an online concierge system 140 with a set of recipes 500, in accordance with one or more embodiments. In this example, suppose that the online concierge system 140 may match 320 the one or more items 405 likely to be available to the customer with a recipe 500 if at least one ingredient included in the recipe 500 corresponds to an item 405 that is likely to be available to the customer. In this example, the online concierge system 140 matches (step 320) items 405b-e likely to be available to the customer with recipe 500a and recipe 500c, but not with recipe 500b since both recipe 500a and recipe 500c include ingredients corresponding to items 405 likely to be available to the customer, but recipe 500b does not. In embodiments in which the online concierge system 140 identifies 310 a quantity of each acquired item 405 likely to be available to the customer, the online concierge system 140 may match 320 the one or more items 405 likely to be available to the customer with the set of recipes 500 based on the quantity of each ingredient required for each recipe 500 and the quantity of each of the one or more items 405 likely to be available to the customer. For example, suppose that only one 14-ounce can of tomatoes is included among the items 405 identified 310 by the online concierge system 140 likely to be available to the customer and a recipe 500 calls for 28 ounces of canned tomatoes. In this example, if none of the other ingredients of the recipe 500 are included among the items 405 likely to be available to the customer, the online concierge system 140 may not match 320 the items 405 likely to be available to the customer with this recipe 500.

Referring back to FIG. 3, the online concierge system 140 also identifies 325 (e.g., using the recipe matching module 265) a set of remaining items 405 for each recipe 500 it matches 320 with the one or more items 405 likely to be available to the customer, in which each remaining item 405 corresponds to an ingredient of a recipe 500 that is not included among the one or more items 405 likely to be available to the customer. For example, suppose that the online concierge system 140 matches 320 the one or more items 405 likely to be available to the customer with a recipe 500 if at least half of the ingredients of the recipe 500 are included among the one or more items 405 likely to be available to the customer. In this example, if three out of five ingredients of a recipe 500 correspond to the one or more items 405 likely to be available to the customer, the online concierge system 140 matches 320 the one or more items 405 likely to be available to the customer with this recipe 500 and identifies 325 the two remaining items 405 for the recipe 500.

The online concierge system 140 retrieves 330 (e.g., using the recipe scoring module 270) a set of attributes associated with the customer and the set of recipes 500 that the online concierge system 140 matches 320 with the one or more items 405 likely to be available to the customer. The set of attributes retrieved 330 by the online concierge system 140 may include one or more preferences associated with the customer (e.g., stored in the data store 240). As described above, preferences associated with a customer may include the customer's dietary preferences (e.g., for certain cuisines or ingredients), dietary restrictions (e.g., vegetarian, vegan, etc.), allergies, or dislikes, and the customer's recipe preferences. For example, the online concierge system 140 may retrieve 330 a set of preferences associated with the customer indicating that the customer prefers spicy foods with rice or noodles as ingredients, is allergic to nuts and dairy, and prefers to make recipes 500 that involve frying and require less than two hours to prepare. The set of attributes retrieved 330 by the online concierge system 140 also may include ingredients of each recipe 500 that the online concierge system 140 matches 320 with the one or more items 405 likely to be available to the customer, an amount of time to prepare each recipe 500, a complexity of each recipe 500, nutritional information about each recipe 500, a genre of each recipe 500, etc. In some embodiments, the set of attributes associated with the customer and the set of recipes 500 also may include a number or a percentage of the one or more items 405 likely to be available to the customer that correspond to the ingredients of each of the set of recipes 500. For example, if the online concierge system 140 identifies 325 three remaining items 405 out of six items 405 corresponding to ingredients of a recipe 500 it matches 320 with the one or more items 405 likely to be available to the customer, the set of attributes associated with the customer and the set of recipes 500 may include an attribute indicating that three or 50% of the items 405 likely to be available to the customer correspond to the ingredients of this recipe 500.

In various embodiments, the set of attributes associated with the customer and the set of recipes 500 retrieved 330 by the online concierge system 140 also may include an expected value associated with a set of remaining items 405 for each of the set of recipes 500. The expected value associated with the set of remaining items 405 for a recipe 500 may be based on a probability that the customer will acquire each remaining item 405 and a value associated with each remaining item 405. For example, suppose that the online concierge system 140 identifies 325 two remaining items 405 for a recipe 500 it matches 320 with the one or more items 405 likely to be available to the customer. In this example, the expected value associated with each remaining item 405 may be calculated as a product of a price of the item 405 and a probability that the customer will purchase the item 405. Continuing with this example, the expected value associated with the remaining items 405 may be calculated as a sum of the expected values associated with the items 405. The probability that the customer will acquire a remaining item 405 may be determined by accessing and applying the item selection model, as described above.

The online concierge system 140 computes 335 (e.g., using the recipe scoring module 270) a suggestion score for each recipe 500 included among the set of recipes 500 that the online concierge system 140 matches 320 with the one or more items 405 likely to be available to the customer. The online concierge system 140 may compute 335 the suggestion score for each recipe 500 based on one or more of the set of attributes associated with the customer and the set of recipes 500. The suggestion score for a recipe 500 may account for various factors, such as a likelihood that the customer will have an affinity for the recipe 500, the number or the percentage of the one or more items 405 likely to be available to the customer that correspond to the ingredients of the recipe 500, the expected value associated with the set of remaining items 405 for the recipe 500, etc. For example, the suggestion score for a recipe 500 may be proportional to the likelihood that the customer will have an affinity for the recipe 500, the number or the percentage of the items 405 likely to be available to the customer that correspond to the ingredients of the recipe 500, and the expected value associated with the set of remaining items 405 for the recipe 500.

The online concierge system 140 ranks 340 (e.g., using the recipe ranking module 275) the recipes 500 included among the set of recipes 500 that the online concierge system 140 matches 320 with the one or more items 405 likely to be available to the customer. The online concierge system 140 may rank 340 the set of recipes 500 based on the suggestion score associated with each recipe 500. For example, the online concierge system 140 may rank (step 340) recipes 500 based on their suggestion scores, such that recipes 500 having higher suggestion scores are ranked 340 higher than recipes 500 having lower suggestion scores.

The online concierge system 140 selects 345 (e.g., using the recipe selection module 280) one or more recipes 500 for suggesting to the customer from the set of recipes 500 that the online concierge system 140 matches 320 with the one or more items 405 likely to be available to the customer. In some embodiments, once the online concierge system 140 has ranked 340 the set of recipes 500, the online concierge system 140 may select 345 one or more recipes 500 for suggesting to the customer based on the ranking. For example, the online concierge system 140 may select 345 one or more of the set of recipes 500 with ranks that exceed some threshold (e.g., the top n ranked items 405 or the p percentile of items 405) for suggesting to the customer. In various embodiments, the online concierge system 140 may select 345 one or more recipes 500 for suggesting to the customer with suggestion scores that exceed some threshold. For example, rather than selecting 345 one or more recipes 500 based on their ranking, the online concierge system 140 may select 345 one or more recipes 500 with suggestion scores that exceed a threshold suggestion score.

The online concierge system 140 then sends 350 (e.g., using the content presentation module 210) the one or more recipes 500 selected 345 by the online concierge system 140 and a set of remaining items 405 identified 325 for each recipe 500 to the customer client device 100 associated with the customer. In such embodiments, each recipe 500 may be presented in association with the set of remaining items 405 identified 325 for the recipe 500. Furthermore, in embodiments in which multiple recipes 500 are selected 345 by the online concierge system 140, the recipes 500 may be presented in an order based on their ranking. For example, a highest ranked recipe 500 and any remaining items 405 identified 325 for the recipe 500 are presented in a most prominent position within a display area of the customer client device 100, a second-highest ranked recipe 500 and any remaining items 405 identified 325 for the recipe 500 are presented in a position within the display area that is second-most prominent, etc.

In embodiments in which the online concierge system 140 detects 305 any acquired items 405 associated with the customer that were not included in an order placed by the customer with the online concierge system 140 and accesses a set of content items associated with these items 405, the online concierge system 140 also may send (e.g., using the content presentation module 210) the set of content items to the customer client device 100 associated with the customer. For example, the online concierge system 140 may send a promotion, a coupon, an advertisement, a social media post, etc. associated with an acquired item 405 that was not included in an order placed by the customer to the customer client device 100. The online concierge system 140 may send the set of content items to the customer client device 100 while the customer is placing an order (e.g., in the ordering interface), in association with a catalog of items 405, with the one or more recipes 500 selected 345 by the online concierge system 140 and a set of remaining items 405 identified 325 for each recipe 500, or in association with any other suitable content.

Additional Considerations

The foregoing description of the embodiments has been presented for the purpose of illustration, and many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising one or more processors and a computer-readable medium, the method comprising:
    detecting a set of acquired items associated with a customer of an online concierge system, wherein the set of acquired items is included among an inventory of the customer;
    identifying one or more candidate available items from the set of acquired items based at least in part on one or more of: a predicted perishability of each acquired item and a predicted amount of each acquired item that has been used, wherein identifying one or more candidate available items comprises:
        accessing a machine learning model that is trained to predict a likelihood that an item is available, wherein the machine learning model is trained by:
            receiving a plurality of attributes associated with a plurality of items included among one or more inventories of one or more retailer locations,
            receiving, for each item of the plurality of items, a label indicating an availability of the item,
            training the machine learning model based at least in part on the plurality of attributes and the label for each of the plurality of items,
            applying the machine learning model to each of the plurality of items to determine a difference between the label and the predicted likelihood of the respective item,
            updating the label of the respective item based on the determined difference, and
            updating the machine learning model for each of the plurality of items using the updated labels; and
        applying the machine learning model to a plurality of attributes of each acquired item of the set of acquired items to predict the likelihood that each acquired item is available;
    retrieving a plurality of recipes from a recipe data store, wherein each recipe comprises one or more ingredients;
    matching the one or more candidate available items with a set of recipes based at least in part on the one or more ingredients of each recipe and the one or more candidate available items;
    identifying a set of remaining items for each recipe of the set of recipes, wherein each remaining item corresponds to an ingredient that is not included among the one or more candidate available items;
    retrieving a set of attributes associated with the customer and the set of recipes;
    computing a suggestion score for each recipe of the set of recipes based at least in part on the set of attributes associated with the customer and the set of recipes;
    ranking the set of recipes based at least in part on the suggestion score for each recipe;
    selecting, from the set of recipes, one or more recipes for suggesting to the customer based at least in part on the ranking; and
    sending, for display to a customer client device associated with the customer, the one or more recipes and the set of remaining items identified for each of the one or more recipes.

2. The method of claim 1, wherein identifying the one or more candidate available items from the set of acquired items is further based at least in part on one or more selected from the group consisting of: a time that each acquired item was acquired, a present time, a date indicating a perishability of each acquired item, and an amount of each acquired item.

3. The method of claim 1, wherein the inventory of the customer comprises a set of contents of one or more of: a shopping cart associated with the customer, a food storage area associated with the customer, and an order previously placed by the customer.

4. The method of claim 3, wherein detecting the set of acquired items associated with the customer comprises:
    receiving, from the customer client device, data associated with the set of contents of the food storage area, wherein the data comprises one or more selected from the group consisting of: an image capturing the set of contents of the food storage area, a video capturing the set of contents of the food storage area, a barcode identifying an item, a QR code identifying an item, and an RFID tag capable of transmitting information identifying an item; and
    detecting the set of items associated with the customer based at least in part on the data.

5. The method of claim 4, wherein the customer client device comprises a smart refrigerator.

6. The method of claim 1, wherein the set of attributes associated with the customer and the set of recipes comprises one or more selected from the group consisting of: a set of preferences associated with the customer, a number of the one or more candidate available items corresponding to the one or more ingredients of a corresponding recipe, and an expected value associated with the set of remaining items for the corresponding recipe.

7. The method of claim 6, further comprising:
    accessing a second machine learning model that is trained to predict a probability that the customer will acquire an item; and
    for each recipe of the set of recipes, applying the second machine learning model to predict the probability that the customer will acquire each item of the set of remaining items.

8. The method of claim 7, wherein the expected value associated with the set of remaining items for the corresponding recipe is based at least in part on the probability that the customer will acquire each remaining item of the set of remaining items and a value associated with each remaining item of the set of remaining items.

9. The method of claim 1, further comprising:
identifying, from the set of acquired items associated with the customer, a subset of acquired items not included in one or more orders placed by the customer with the online concierge system;
accessing a set of content items associated with the subset of acquired items; and
sending the set of content items to a display area of the customer client device.

10. A computer program product comprising a non-transitory computer readable storage medium having instructions encoded thereon that, when executed by a processor, cause the processor to perform actions comprising:
detecting a set of acquired items associated with a customer of an online concierge system, wherein the set of acquired items is included among an inventory of the customer;
identifying one or more candidate available items from the set of acquired items based at least in part on one or more of: a predicted perishability of each acquired item and a predicted amount of each acquired item that has been used, wherein identifying one or more candidate available items comprises:
accessing a machine learning model that is trained to predict a likelihood that an item is available, wherein the machine learning model is trained by:
receiving a plurality of attributes associated with a plurality of items included among one or more inventories of one or more retailer locations,
receiving, for each item of the plurality of items, a label indicating an availability of the item,
training the machine learning model based at least in part on the plurality of attributes and the label for each of the plurality of items,
applying the machine learning model to each of the plurality of items to determine a difference between the label and the predicted likelihood of the respective item,
updating the label of the respective item based on the determined difference, and
updating the machine learning model for each of the plurality of items using the updated labels; and
applying the machine learning model to a plurality of attributes of each acquired item of the set of acquired items to predict the likelihood that each acquired item is available;
retrieving a plurality of recipes from a recipe data store, wherein each recipe comprises one or more ingredients;
matching the one or more candidate available items with a set of recipes based at least in part on the one or more ingredients of each recipe and the one or more candidate available items;
identifying a set of remaining items for each recipe of the set of recipes, wherein each remaining item corresponds to an ingredient that is not included among the one or more candidate available items;
retrieving a set of attributes associated with the customer and the set of recipes;
computing a suggestion score for each recipe of the set of recipes based at least in part on the set of attributes associated with the customer and the set of recipes;
ranking the set of recipes based at least in part on the suggestion score for each recipe;
selecting, from the set of recipes, one or more recipes for suggesting to the customer based at least in part on the ranking; and
sending, for display to a customer client device associated with the customer, the one or more recipes and the set of remaining items identified for each of the one or more recipes.

11. The computer program product of claim 10, wherein identifying the one or more candidate available items from the set of acquired items is further based at least in part on one or more selected from the group consisting of: a time that each acquired item was acquired, a present time, a date indicating a perishability of each acquired item, and an amount of each acquired item.

12. The computer program product of claim 10, wherein the inventory of the customer comprises a set of contents of one or more of: a shopping cart associated with the customer, a food storage area associated with the customer, and an order previously placed by the customer.

13. The computer program product of claim 12, wherein detect the set of acquired items associated with the customer comprises:
receiving, from the customer client device, data associated with the set of contents of the food storage area, wherein the data comprises one or more selected from the group consisting of: an image capturing the set of contents of the food storage area, a video capturing the set of contents of the food storage area, a barcode identifying an item, a QR code identifying an item, and an RFID tag capable of transmitting information identifying an item; and
detecting the set of items associated with the customer based at least in part on the data.

14. The computer program product of claim 13, wherein the customer client device comprises a smart refrigerator.

15. The computer program product of claim 10, wherein the set of attributes associated with the customer and the set of recipes comprises one or more selected from the group consisting of: a set of preferences associated with the customer, a number of the one or more candidate available items corresponding to the one or more ingredients of a corresponding recipe, and an expected value associated with the set of remaining items for the corresponding recipe.

16. The computer program product of claim 15, wherein the non-transitory computer readable storage medium further has instructions encoded thereon that, when executed by the processor, cause the processor to perform actions comprising:
accessing a second machine learning model that is trained to predict a probability that the customer will acquire an item; and
for each recipe of the set of recipes, applying the second machine learning model to predict the probability that the customer will acquire each item of the set of remaining items.

17. The computer program product of claim 16, wherein the expected value associated with the set of remaining items for the corresponding recipe is based at least in part on the probability that the customer will acquire each remaining item of the set of remaining items and a value associated with each remaining item of the set of remaining items.

18. A computer system comprising:
a processor; and
a non-transitory computer readable storage medium storing instructions that, when executed by the processor, perform actions comprising:
  detecting a set of acquired items associated with a customer of an online concierge system, wherein the set of acquired items is included among an inventory of the customer;
  identifying one or more candidate available items from the set of acquired items based at least in part on one or more of: a predicted perishability of each acquired item and a predicted amount of each acquired item that has been used, wherein identifying one or more candidate available items comprises:
    accessing a machine learning model that is trained to predict a likelihood that an item is available, wherein the machine learning model is trained by:
      receiving a plurality of attributes associated with a plurality of items included among one or more inventories of one or more retailer locations,
      receiving, for each item of the plurality of items, a label indicating an availability of the item,
      training the machine learning model based at least in part on the plurality of attributes and the label for each of the plurality of items,
      applying the machine learning model to each of the plurality of items to determine a difference between the label and the predicted likelihood of the respective item,
      updating the label of the respective item based on the determined difference, and
      updating the machine learning model for each of the plurality of items using the updated labels; and
    applying the machine learning model to a plurality of attributes of each acquired item of the set of acquired items to predict the likelihood that each acquired item is available;
  retrieving a plurality of recipes from a recipe data store, wherein each recipe comprises one or more ingredients;
  matching the one or more candidate available items with a set of recipes based at least in part on the one or more ingredients of each recipe and the one or more candidate available items;
  identifying a set of remaining items for each recipe of the set of recipes, wherein each remaining item corresponds to an ingredient that is not included among the one or more candidate available items;
  retrieving a set of attributes associated with the customer and the set of recipes;
  computing a suggestion score for each recipe of the set of recipes based at least in part on the set of attributes associated with the customer and the set of recipes;
  ranking the set of recipes based at least in part on the suggestion score for each recipe;
  selecting, from the set of recipes, one or more recipes for suggesting to the customer based at least in part on the ranking; and
  sending, for display to a customer client device associated with the customer, the one or more recipes and the set of remaining items identified for each of the one or more recipes.

* * * * *